United States Patent [19]

Iwai

[11] Patent Number: 5,041,769
[45] Date of Patent: Aug. 20, 1991

[54] DC MOTOR APPARATUS WITH AN INDEX SIGNAL OUTPUT

[75] Inventor: Hiroshi Iwai, Fujieda, Japan

[73] Assignee: Victor Company of Japan, Ltd., Japan

[21] Appl. No.: 373,003

[22] Filed: Jun. 29, 1989

[30] Foreign Application Priority Data

Jun. 29, 1988 [JP] Japan .................. 63-161173

[51] Int. Cl.⁵ .............................................. H02P 6/02
[52] U.S. Cl. ..................... 318/254; 318/138
[58] Field of Search ................................ 318/254, 138

[56] References Cited

U.S. PATENT DOCUMENTS

| | | | |
|---|---|---|---|
| 4,228,396 | 10/1980 | Palombo et al. | 318/254 |
| 4,680,515 | 7/1987 | Crook | 318/254 |
| 4,717,864 | 2/1988 | Fultz | 318/254 |
| 4,899,093 | 2/1990 | Gleim | 318/254 |

Primary Examiner—Bernard Roskoski

Attorney, Agent, or Firm—Lowe, Price, LeBlanc & Becker

[57] ABSTRACT

A dc motor apparatus with an index signal output comprises: a dc motor including: a stator having driving coils; a rotor having plural pairs of magnetic poles; plural magnetic sensors provided to the stator for sensing magnetic flux from the plural magnetic poles, one of the sensors producing a first signal; and a driving circuit responsive to output signals of the plural magnetic sensors for producing drive signals to energize the driving coils; and one of the magnetic poles magnetized to exhibit a different intensity of magnetic flux density from that of remaining poles; a peak level detecting circuit responsive to the first signal for detecting a peak level thereof and holding it for a predetermined interval to produce a reference signal; and comparing circuit for producing a second signal when the first signal has a predetermined relationship with the reference signal n. A level of the reference signal is changed in accordance with a detected peak level of the signal of the magnetic sensors to generate an index signal stably.

2 Claims, 4 Drawing Sheets

DC MOTOR APPARATUS WITH AN INDEX SIGNAL OUTPUT

BACKGROUND OF THE INVENTION

1. Field of the Invention

This invention relates to a dc motor apparatus with an index signal output.

2. Description of the Prior Art

A dc motor apparatus with an index signal output is used for apparatus using a dc motor which is required to produce a rotational position signal per full revolution of the dc motor.

A prior art dc motor apparatus with an index signal output is disclosed in Japanese patent application provisional publication No. 61-106056. The disclosed dc motor is as follows:

This dc motor generally comprises a stator, a rotor, and a drive circuit. The stator has magnetic sensors for sensing magnetic flux from field magnets provided to a rotor. Coils of the stator are driven by the drive circuit in response to the signals from the magnetic sensors. A magnetic non-continuous portion is provided to one of the field magnets. The dc motor further comprises a detecting circuit for detecting the magnetic non-continuous portion from one of the magnetic sensors to output an index signal.

However, there is a drawback that output signals from such magnetic sensors is unstable due to variation of temperature, ununiformity of sensitivity of the magnetic sensors, and inaccuracy in assembling, etc., so that it is difficult to distinguish the output signal of the sensor indicative of magnetic non-continuous portion from that indicative of other portion.

SUMMARY OF THE INVENTION

The present invention has been developed in order to remove the above-described drawbacks inherent to the conventional dc motor apparatus with an index signal output.

According to the present invention there is provided a dc motor apparatus with an index signal output comprising: a dc motor including: a stator having driving coils; a rotor having plural pairs of magnetic poles; plural magnetic sensors provided to the stator for sensing magnetism from the plural magnetic poles, one of the sensors producing a first signal; and a driving circuit responsive to output signals of the plural magnetic sensors for producing drive signals to energize the driving coils; and a circuit for causing one of the magnetic poles to exhibit a different magnetic flux density from that of remaining poles; a peak level detecting circuit responsive to the first signal for detecting a peak level thereof and holding it for a predetermined interval to produce a reference signal; and comparing circuit for producing a second signal when the first signal has a predetermined relationship with the reference signal. A level of the reference signal is changed in accordance with a detected peak level of the signal of the magnetic sensors to generate an index signal stably.

BRIEF DESCRIPTION OF THE DRAWINGS

The object and features of the present invention will become more readily apparent from the following detailed description taken in conjunction with the accompanying drawings in which.

The same or corresponding elements or parts are designated at like references throughout the drawings.

DETAILED DESCRIPTION OF THE INVENTION

Figure 1:
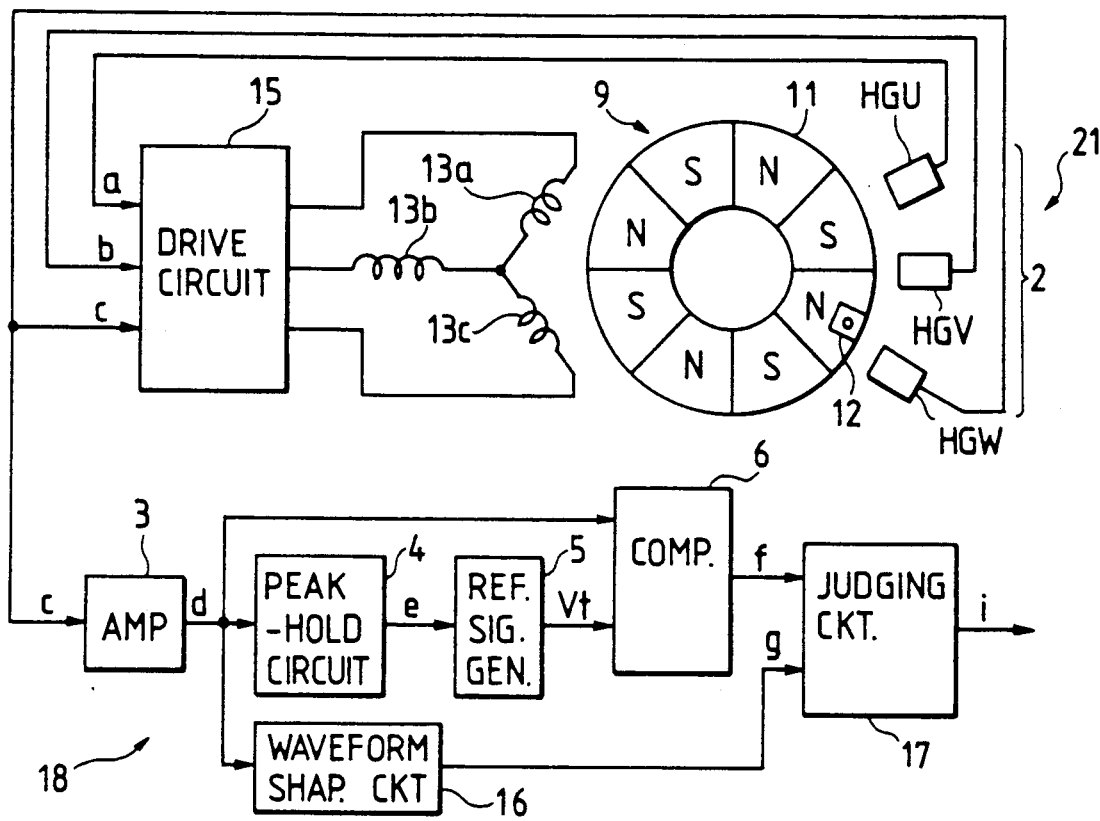
FIG. 1 is a block diagram of a first embodiment of a dc motor apparatus.
Figure 4:
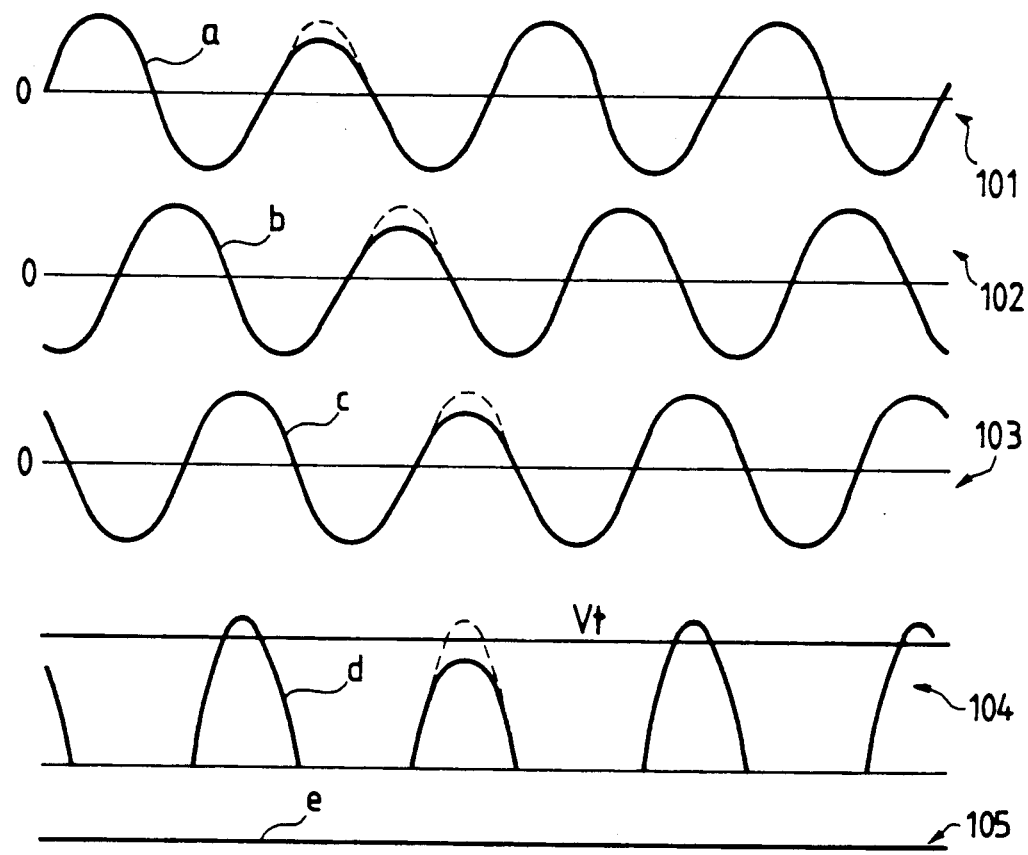
FIG. 4 shows waveforms for illustrating operation of the dc motor apparatus of FIG. 1.
Figure 4:
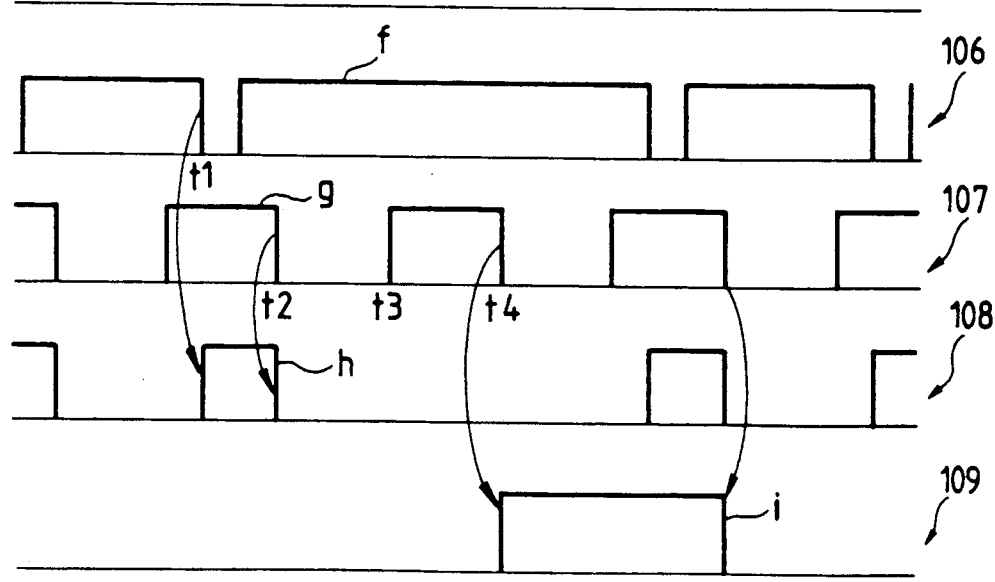

Referring now to the drawings, FIG. 1 is a block diagram of a dc motor apparatus with an index signal output of the invention. FIG. 4 shows waveforms for illustrating operation of the dc motor apparatus.

In FIG. 1, the dc motor apparatus with an index signal output comprises: a dc motor 21 including: a stator having driving coils 13a, 13b, and 13c; a rotor 9 having four sets of magnetic poles 11; Hall generators HGU, HGV, and HGW provided to the stator for sensing magnetic flux from the magnetic poles 11; and a drive circuit 15 responsive to signals "a", "b", and "c" respectively coming from the Hall generators HGU, HGV, and HGW for producing drive signals to drive the driving coils 13a, 13b, and 13c for rotating the rotor 9; and an index signal signal generation circuit 18. One of the magnetic poles has a marked portion 12 whose intensity of magnetization is smaller than that of corresponding portions other magnetic poles. This magnetic pole is referred to as a marked pole.

Figure 2:
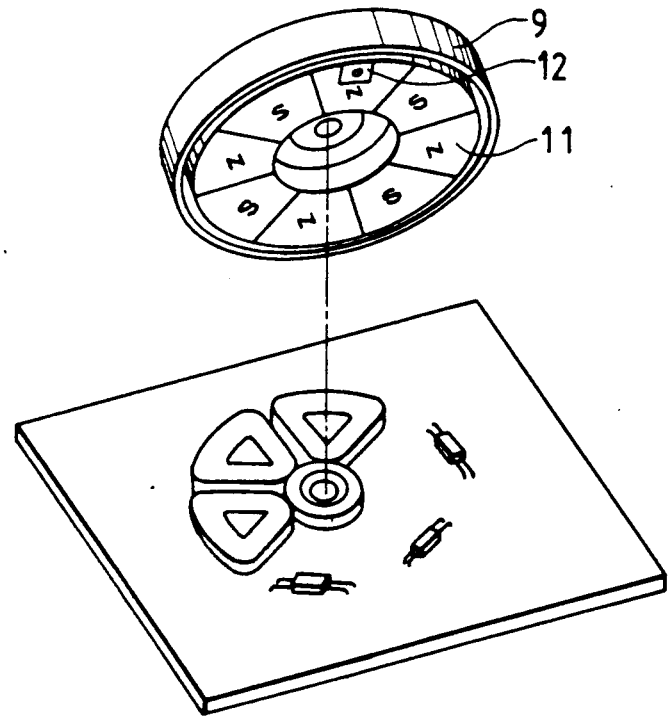
FIG. 2 is a perspective view of a disassembled dc motor shown in FIG. 1.

FIG. 2 shows a perspective view of the rotor 9 and stator 10 which are disassembled. The marked portion 12 is arranged at a peripheral portion of the magnetic poles 11.

The signal "c", i.e., the output signal of the Hall generator HGW is sent to an amplifier 3 of the index signal generation circuit 18. A signal "d" from the amplifier 3 is sent to one input of a comparator 6, a peak-hold circuit 4, and a waveform-shaping circuit 16. The peak-hold circuit 4 detects a peak level of the signal "d" and holds the level at output thereof when a peak level is detected. The waveform shaping circuit 16 further amplifies the signal "d" and shapes waveforms of the amplified signal "d" to supply a rectangular wave signal "g" to one input of a judging circuit 17. An output signal "e" of the peak hold circuit 4 is sent to a reference signal generator 5 which generates a reference voltage signal Vt sent to another input of a voltage comparator 6 which compares the signal "d" with the reference voltage signal Vt to output a signal "f" sent to another input of the judging circuit 17. The judging circuit 17 detects a peak having a lower peak level than that of other peaks to output the index signal "i" in response to the signals "f" and "g".

Figure 3:
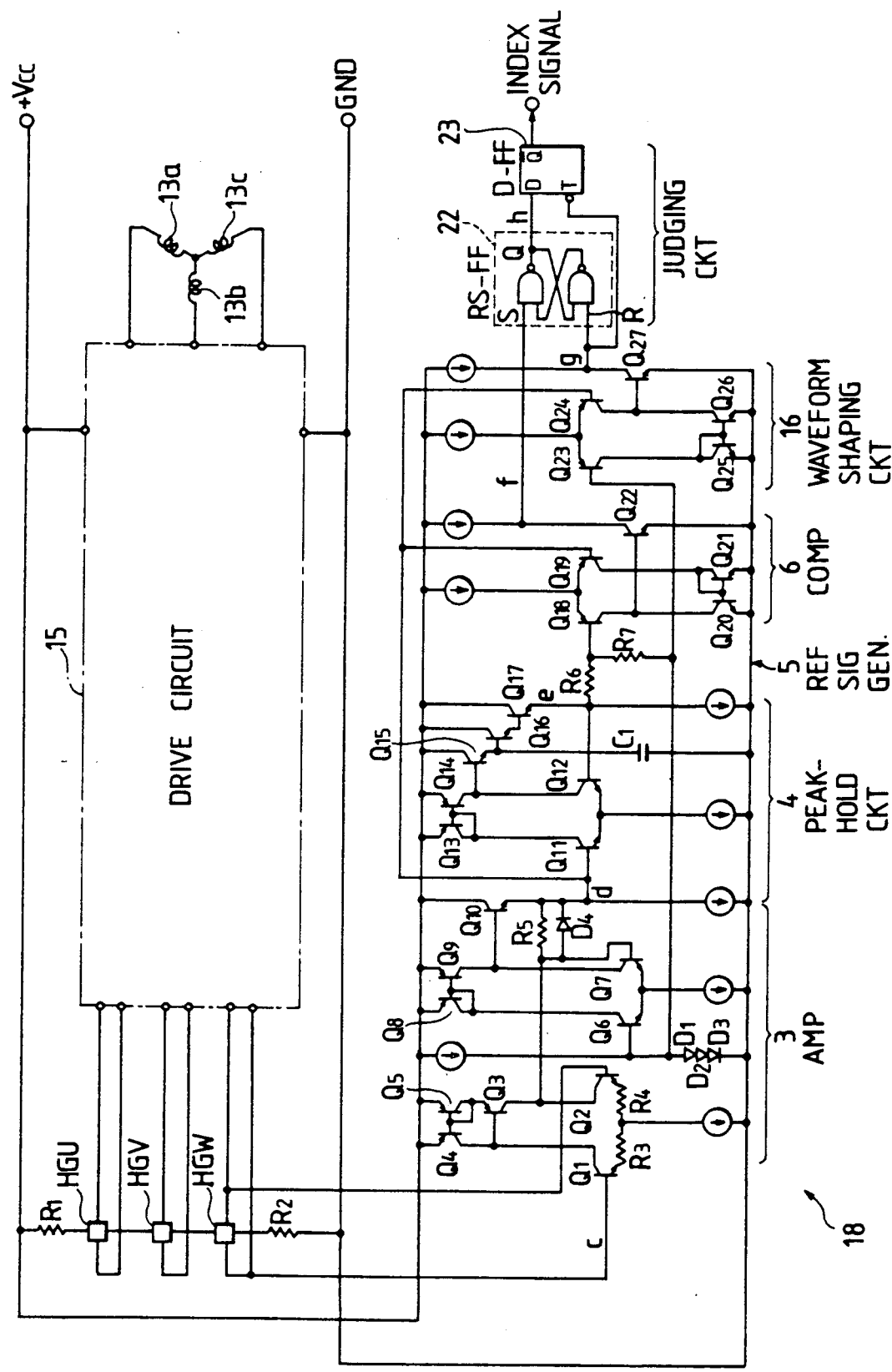
FIG. 3 is a circuit diagram of the dc motor apparatus of FIG. 1.

FIG. 3 shows the detailed circuit arrangement of the index signal generation circuit 18. In FIG. 3, the signal "c" is sent to the amplifier 3 which includes an NPN transistors Q1-Q10 and resistors R3-R5. The signal "d" is outputted from an emitter of the transistor Q10. The waveform of the signal "d" is shown in FIG. 4. The peak-hold circuit 4 comprising transistors Q11-Q17, and capacitor C1 detects a peak level of the signal "d" and holds the level at an output thereof when a peak level is detected. The output signal "e" is outputted from an emitter of the transistor Q17. The reference signal generator 5 comprising resistors R6 and R7 generates the reference signal Vt whose potential is 85% of its input level by dividing the signal "e". The comparator 6 comprising transistors Q18–Q22 compares the signal "d" with the reference voltage signal Vt to output a signal "f" sent to another input of the judging circuit 17. The waveform 104 in FIG. 4 shows that the peak level generated by the marked pole is distinguished from peak levels generated by other magnetic poles by being referred to the reference level Vt. It should be noted that the magnitude of the magnetic flux density generated by the marked pole is smaller than that of the magnetic flux density generated by other magnetic poles. The waveform shaping circuit 16 comprising transistors Q23–Q27 further amplifies the signal "d" and waveform-shapes to output a rectangular wave signal "g" sent to one input of a judging circuit 17. The waveform 107 shows the signal "g". The waveform shaping circuit 16 is also considered as a zero-cross detecting circuit. The judging circuit 17 comprises an RS-flip-flop (FF) 22 which is set by the signal "f" and reset by the signal "g" and outputs a signal "h" at Q output and a D-FF 23 which holds its D input level from Q output in response to the signal "g" applied to T input.

The judging circuit 17 operates as follows:

The RS-FF 22 outputs H (logic H) in response to a low level of the signal "f" and outputs L (logic "L") in response to a low level of the signal "g". The D-FF 23 holds a level of the signal "h" from the RS-FF 22 at its Q output in response to the signal "g" to output the index signal. The RS-FF 22 is set at t1 and reset at t2, as shown FIG. 4. The D-FF 23 holds the signal "h" at t2, but its output remains at L level until clock signal "g" is received at t4. During an interval between t3 and t4, the RS-FF 22 is not set, and its output remains at L level. Therefore, the D-FF 23 outputs H at t4 in response to the signal "g".

As mentioned above, the index signal is generated by detecting low peak level of the signal "c" through a digital circuit arrangement. However, the index signal can be also generated by an unshown sample-and-holed circuit of an analog circuit in response to signals "f", "g", and "h".

The level of the reference voltage signal Vt depends on the peak level of the signal "c". Thus, this eliminates necessity of an adjustment such as gain adjusting of the amplifier 3 or adjusting dividing ratio of the reference signal generator 5, reducing manufacturing cost of the dc motor apparatus.

Moreover, when the dc motor apparatus operated at a high temperature, the output level of the signal "c" decreases. However, the index signal is generated stably because the reference voltage signal Vt also decreases in accordance with decrement of output level of the signal "c". When the dc motor operated at a low temperature, the output level of the signal "c" decreases, the reference voltage signal Vt also decreases so that the dc motor generates the index signal without errors. Therefore, the dc motor of the invention stably generates the index signal over a wide operating temperature range.

The index signal "i" is generated with accurate timing compared with the prior art dc motor apparatus which generates an index signal by detecting only peak level of the magnetic sensor. According to the invention the index signal is generated when sign of the signal "c" changes after detection of the marked pole rather than when the peak level of the marked pole is detected. This is because change of the signal "c" in level around zero level is rapid compared with that around peak level.

The above-mentioned index signal generation circuit 18 generates the index signal "i" in response to the signal "c" from the magnetic sensor. However, optical sensors can be used for providing an index signal through the index signal generation circuit 18 as follows:

A dc motor with an optical encoder which comprises a light source, a rotary disc with slits (in transmission type) or with black and white pattern (in reflection type), and a light sensor for receiving light from the light source through the slits or reflected at the disc. An index signal is obtained by detecting one of slits or reflection portions whose radial dimension differs from others.

Figure 5:
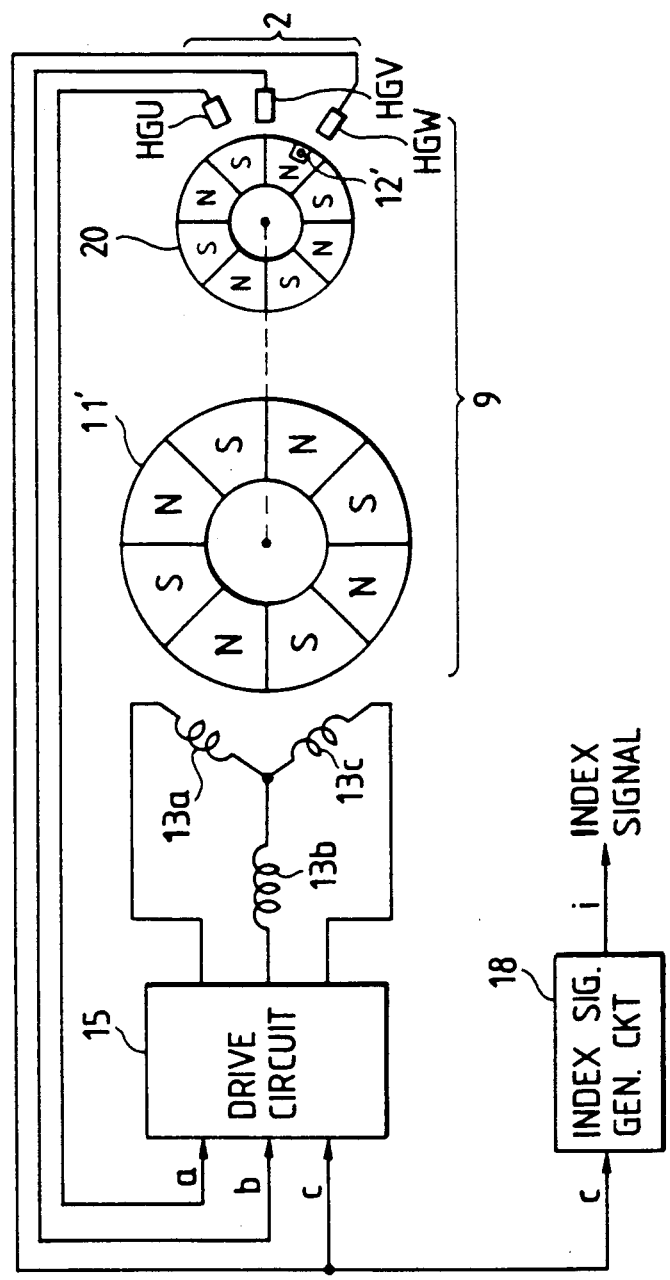
FIG. 5 is a block diagram of a dc motor apparatus of a second embodiment.

FIG. 5 is a block diagram of a dc motor with index signal output of a second embodiment. In FIG. 5, the dc motor apparatus generally includes the same components as the dc motor apparatus of the first embodiment. However, there is a magnetic pole belt 20 having four sets of magnetic poles for generating position signal, which is provided to or connected to the rotor 9 having a conventional magnetic poles 11'. The magnetic pole belt 20 is so arranged that the magnetic poles thereof correspond to those of the magnetic poles 11. Hall generators HGU, HGV, and HGW are arranged to receive magnetic flux from the magnetic poles of the magnetic pole belt 20. One of the magnetic poles of the magnetic pole belt 20 has a marked portion 12' whose intensity of magnetization is smaller than that of corresponding portions of other magnetic poles of the magnetic pole belt 20. Output signals from the Hall generators HGU, HGV, and HGW are used for the drive circuit 15 and processed by the index signal generation circuit 18 in a similar manner to that of the dc motor of the first embodiment.

What is claimed is:

1. A dc motor apparatus with an index signal output comprising:

(a) a dc motor including:
    a stator having driving coils; a rotor having plural pairs of magnetic poles; plural magnetic sensors provided on said stator for producing output signals by sensing magnetic flux from said plural magnetic poles; and driving means responsive to said output signals of said plural magnetic sensors for producing drive signals to energize said driving coils; and
    means for causing one of said magnetic poles to exhibit a different intensity of magnetic flux density from that of remaining poles, one of said sensors producing a first signal in response to said difference intensity;

(b) peak level detecting means responsive to said first signal for detecting a peak level thereof and holding it for a predetermined interval to produce a reference signal;

(c) comparing means for producing a second signal when said first signal has a predetermined relationship with said reference signal by comparing said first signal with said reference signal;

zero-cross detecting means producing a third signal when detecting that said first signal substantially crosses zero level; and logic circuit means responsive to said second and third signals for producing said index signal at a predetermined point when said second signal assumes a given level within a period defined by said third signal.

2. A dc motor apparatus with an index signal output comprising:

(a) a dc motor including:

a stator having driving coils; a rotor having plural pairs of magnetic poles; plural magnetic sensors provided on said stator for producing output signals by sensing magnetic flux from said plural magnetic poles; and driving means responsive to said output signals of said plural magnetic sensors for producing drive signals to energize said driving coils; and means for causing one of said magnetic poles to exhibit a different intensity of magnetic flux density from that of remaining poles, one of said sensors producing a first signal in response to said difference intensity;

(b) peak level detecting means responsive to said first signal for detecting a peak level thereof and holding it for a predetermined interval to produce a reference signal;

(c) comparing means for producing a second signal when said first signal has a predetermined relationship with said reference signal by comparing said first signal with said reference signal;

zero-cross detecting means producing a third signal when detecting that said first signal substantially crosses zero level;

an R-S flip-flop set by said second signal, reset by said third signal; and a D flip-flop for holding level of its D input responsive to an output from said R-S flip-flop and for outputting held level in response to said third signal to produce said index signal.

* * * * *